US009571334B2

(12) United States Patent
Wessels et al.

(10) Patent No.: US 9,571,334 B2
(45) Date of Patent: Feb. 14, 2017

(54) SYSTEMS AND METHODS FOR CORRELATING ALARMS IN A NETWORK

(71) Applicant: CENX, Inc., Ottawa (CA)

(72) Inventors: Bruce Wessels, Ottawa (CA); Peyo Tzolov, Ottawa (CA)

(73) Assignee: CENX, Inc., Ottawa (CA)

( * ) Notice: Subject to any disclaimer, the term of this patent is extended or adjusted under 35 U.S.C. 154(b) by 192 days.

(21) Appl. No.: 14/605,604

(22) Filed: Jan. 26, 2015

(65) Prior Publication Data

US 2016/0218911 A1     Jul. 28, 2016

(51) Int. Cl.
*H04L 12/24* (2006.01)

(52) U.S. Cl.
CPC ......... *H04L 41/065* (2013.01); *H04L 41/0609* (2013.01)

(58) Field of Classification Search
CPC ... H04L 41/0609; H04L 41/065; H04W 76/04; H04W 24/08
See application file for complete search history.

(56) References Cited

U.S. PATENT DOCUMENTS

| | | | | |
|---|---|---|---|---|
| 2012/0093005 A1* | 4/2012 | Li | ............ | H04L 41/064 370/242 |
| 2016/0098018 A1* | 4/2016 | Van Camp | ......... | G05B 23/0272 700/80 |
| 2016/0183109 A1* | 6/2016 | Kiesekamp | ......... | H04L 41/0609 370/252 |

* cited by examiner

*Primary Examiner* — Kim T Nguyen
(74) *Attorney, Agent, or Firm* — Sterne, Kessler, Goldstein & Fox P.L.L.C.

(57) ABSTRACT

Networking equipment often generates alarms that operators must sift through to troubleshoot the network. The heterogeneous nature of the equipment and their associated alarms renders this task difficult. Furthermore, a network fault may trigger collateral alarms in adjacent equipment, sometimes obscuring the root cause of the fault. The present disclosure includes a system for correlating multiple successive alarms to discriminate between alarms from a faulty network object and alarms from a properly functioning network object that is dependent on the faulty network object.

20 Claims, 9 Drawing Sheets

SYSTEMS AND METHODS FOR CORRELATING ALARMS IN A NETWORK

BACKGROUND

Field of Disclosure

Certain embodiments of the invention relate to communication networks. More specifically, certain embodiments of the invention relate to methods and systems for correlating alarms in a communication network.

Background

Modern communications carriers operate local, regional, and nationwide networks to provide connectivity to customers. These networks are built with a variety of equipment to perform various tasks, and such equipment may be manufactured by multiple vendors. Each piece of equipment, referred herein as a network element, may be complex enough to handle hundreds or thousands of simultaneous connections, and different pieces of equipment may be widely dispersed across a region. Wireless base stations, for example, are geographically distributed across a city to optimize coverage and efficiency. Customer expectations of network availability, given such distribution, complexity, and heterogeneity of equipment, mandates fast detection and accurate diagnosis of equipment problems that may arise.

To aid in the detection and diagnosis of problems, network equipment often generates alarms for sub-components within the system. For example, a failing port in a router may trigger an alarm. Even non-communications equipment such as cooling fans can generate alarms. Any physical or logical component associated with a network that generates or triggers alarms in the network is referred herein as a network object.

Alarms can be useful tools for detecting and diagnosing network problems, but they may not always indicate a failure in the network object generating the alarm. Specifically, a failure in one network object may generate an alarm from the failing element and cause the generation of nearly simultaneous alarms from several other elements that depend on the failing element. When a failure in a single network object causes a number of associated alarms, the operator is forced to sift through the alarms and perform extraneous diagnostics simply to determine where the true source of failure is. The problem is further compounded in networks with potentially millions of alarm-generating network objects manufactured by multiple vendors with different alarm protocols and formats.

BRIEF SUMMARY OF THE INVENTION

The present disclosure includes a system and method for correlating multiple successive alarms to discriminate between alarms from a faulty network object and alarms from a properly functioning network object that is dependent on the faulty network object. The systems and methods disclosed improve the operation of network hardware equipment through enhanced alarm monitoring and analysis. Enhanced alarm monitoring and analysis reduces down time for hardware devices and assists in optimizing the performance of hardware through early detection and resolution of faults and potential faults. A method for building a network alarm topology for use in alarm analysis is also disclosed.

An objective of the present invention is to categorize the plurality of alarms that may be generated in a network. The alarm categories may be based on temporal and/or topological information and may distinguish between alarms generated at a source of failure and alarms generated at a network object dependent on a failed element.

Another objective of the present invention is to collect, filter, and normalize network alarms so that relevant alarms may be jointly processed and analyzed.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION OF THE DISCLOSURE

Figure 1:
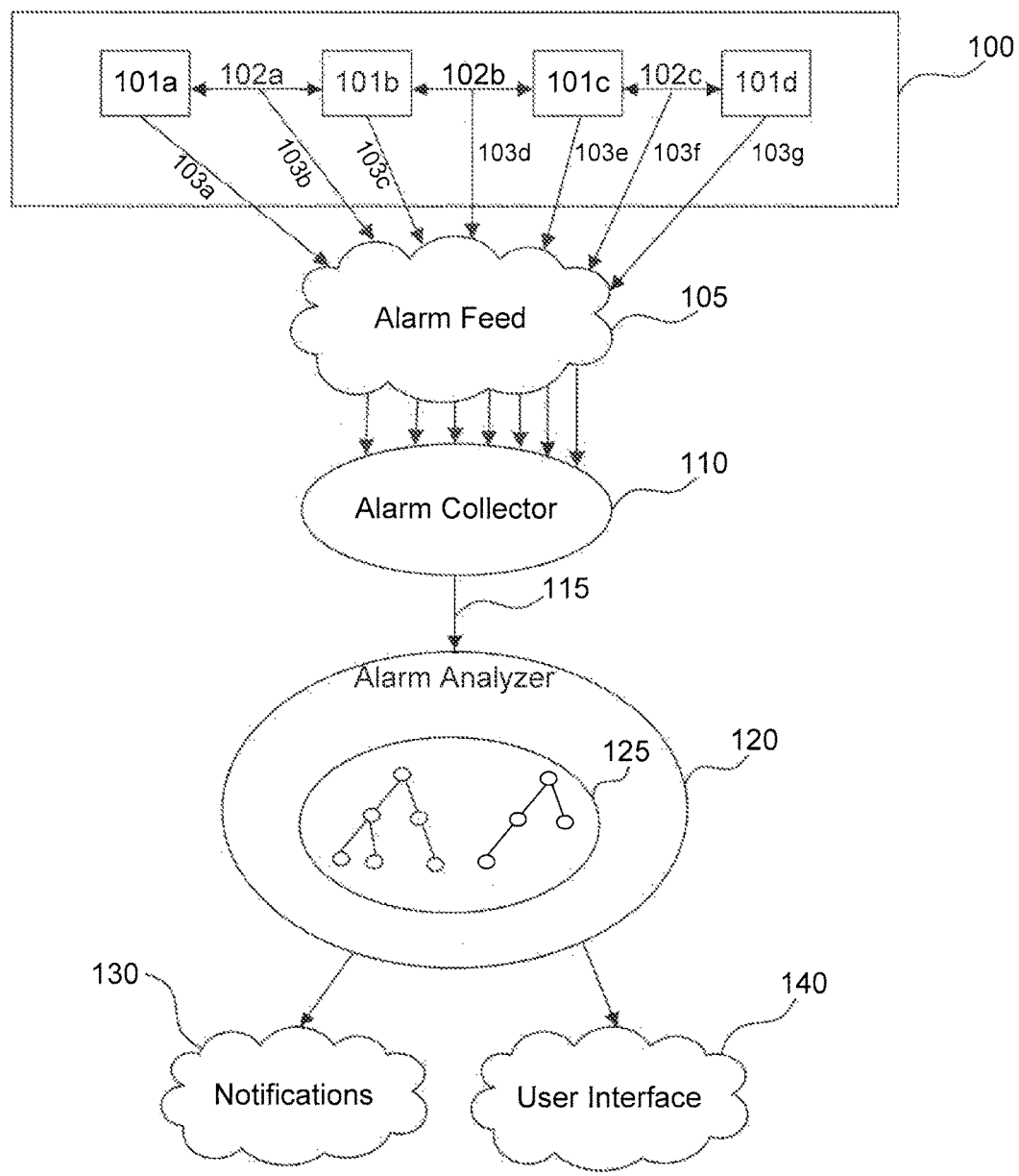
FIG. 1 illustrates an embodiment of the invention within the context of a network of alarm-generating network elements.

FIG. 1 illustrates an embodiment of the invention in the context of an alarm generating network 100. Alarm generating network 100 is provided as an example to illustrate embodiments of the invention, and is not intended to limit the scope of the disclosures herein. Specifically, the present disclosure is applicable to any number or arrangement of network objects in a network. The network 100 comprises seven alarm-generating objects: 101*a*-101*d* and 102*a*-102*c*. The objects 101*a*-101*d* and 102*a*-102*c* are each configured to generate an alarm 103*a*-103*g* upon detection of a potential problem that may require the attention of a network operator. Example alarms may include FAIL, WARNING, UNAVAILABLE, OK, CLEAR, or their equivalents. The alarm feed 105 provides a channel to the network operation center for the alarms 103 to be collected and analyzed. The alarm collector 110 receives, filters, and normalizes the alarms 103 to provide a vendor-agnostic output 115 to the alarm analyzer 120. The alarm analyzer 120 processes the filtered alarms 115 and, using an internal topological representation 125 of the network 100, discriminates between alarms 115 generated at a network object 101/102 originating a failure and alarms 115 generated at a network object 101/102 as a result of failure in another network object 101/102. The alarm analyzer 120 is able to provide notifications 130 regarding changes in network status as well as a user interface 140 to display status or alarm history.

As an example of an embodiment of the system operation, when network object 101a fails, it generates an alarm 103a received by the alarm collector 110. The failure of network object 101a may also cause an alarm 103b to be generated by network object 102a, followed by alarms 103d and 103f generated from network objects 102b and 102c. These alarms 103a, 103b, 103d, and 103f may occur less than 1 second apart, making resolution of the source of the failure (network object 101a) difficult. The alarm analyzer 120 disclosed herein, using an internal representation 125 of the alarm-generating network 100 and temporal information about the alarms 103, may detect that the alarm 103a generated by network object 101a occurred first, and that this failure most likely caused the alarms 103b, 103d, and 103f from network objects 102a, 102b, and 102c successively. Such a discrimination allows the network operator to focus attention on fixing the source of the problem—network object 101a—rather than on figuring out where the problem originated. This reduces network hardware downtime and optimizes equipment efficiency.

Figure 2:
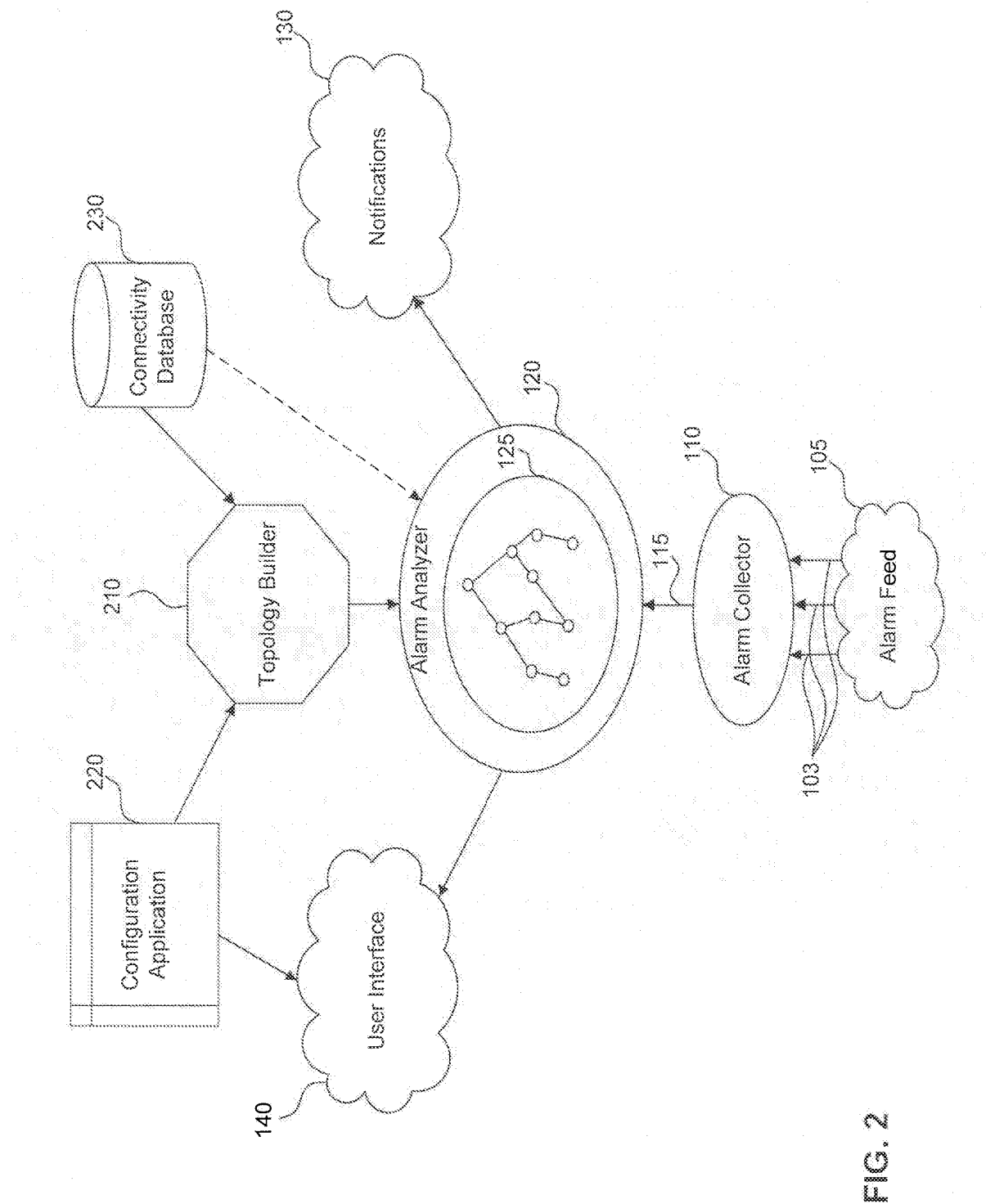
FIG. 2 illustrates an embodiment of the disclosed system for determining sources of failure in a network.

FIG. 2 illustrates a more detailed embodiment of the disclosed system for determining sources of failure in a network. A topology builder 210 takes as input application-specific rules and associations from the configuration application 220, along with network layout information from the connectivity database 230, and outputs a network topology 125 to the alarm analyzer 120. The alarm analyzer 120 receives filtered and normalized alarms 115 from the alarm collector 110 and sets the alarm states of the associated alarm nodes in the topology 125. The alarm analyzer 120 correlates multiple alarms using temporal and topological information to determine which network objects are likely to have generated alarms due to problems within the network object (failure alarms) and which network objects are likely to have generated alarms due to problems external to the network object (dependent alarms).

The configuration application 220 may have access to rules for determining dependencies between a plurality of network objects. For example, a rule may indicate that the operation of one type of object affects the operation of another type of object. This information may aid the topology builder 210 to construct the topology 125. The rules may be application- or vendor-specific and/or configurable by a user. The configuration application 220 may also have access to associations between alarms 103 and network objects 101/102. Such information may comprise, for example, which objects raise which alarms, the different levels of alarms that may be raised by an object, or the format of the alarms generated by an object. Like the rules, the associations between alarms and network objects may be application-specific and/or configurable by a user.

The connectivity database 230 has access to information about a connective layout of the network 100. For example, the connectivity database 230 may contain information about the equipment deployed in the network, including their model numbers or other identification, locations, and how the different network elements are connected. This information may be useful to the topology builder 210 in constructing the network alarm topology 125. Changes in the network may be dynamically updated in the connectivity database 230 and provided to the topology builder 210 for dynamic updates to the network alarm topology 125. The connectivity database 230 may also provide provisioning state changes directly to the alarm analyzer 120 since these may not change the network alarm topology.

The alarm collector 110 collects alarms 103 from the network objects via the alarm feed 105. It may process the alarms 103 in some way, or it may pass the alarms unprocessed to the alarm analyzer 120. The alarm collector 110 may normalize the incoming alarms 103 such that alarms from different vendor equipment and/or using different formats may be analyzed by the alarm analyzer 120 using vendor-agnostic methods. The alarm collector 120 may also sort the alarms, for example in chronological order of generation, or in chronological order of reception. The alarm collector 120 may also filter unmonitored alarms such that one or more alarms 103 collected by alarm collector 110 are not passed to the alarm analyzer 120.

The topology builder 210 is coupled to the connectivity database 230 and the configuration application 220 and is configured to construct a network alarm topology 125. The network alarm topology 125 is a representation of the network 100 in terms of its alarms 103 and their relations. While FIG. 2 illustrates the topology in the form of a graph, the topology 125 may be represented by a graph, tree, relational database, or other representation of related units. The topology builder 210 may dynamically adjust the topology 125 based on changes to the connective layout, as discussed above in relation to the connectivity database 230. Operation of the topology builder 210 is discussed below in relation to FIGS. 3A-3D.

The alarm analyzer 120 is coupled to the topology builder 210 and the alarm collector 110, and is configured to discriminate between failure alarms and dependence alarms. In general, an alarm on its own may not be sufficient to troubleshoot a network problem. The alarm analyzer 120 is able to process a plurality of alarms 115 in the context of the relationships of the network objects that generate them, thereby discriminating between alarms from network objects experiencing a fault and alarms from network objects experiencing collateral effects of a fault. This discrimination process is discussed below in detail in relation to FIGS. 4 and 5A-5E.

The alarm analyzer 120 may output information to a user interface 140. Such information may include an alarm history and/or a graphical representation of all or a portion of the topology 125. The graphical topology may include a representation of the alarm states of the nodes in the topology, including alarm nodes and aggregation nodes as discussed below. For example, when an alarm state is "Normal" or "OK", a node may be represented as a green circle; when an alarm state is "Failure Alarm", a node may be represented as a red circle; and when an alarm state is "Dependent Alarm", the node may be represented as a yellow circle. Although FIG. 2 shows the user interface 140 for the alarm analyzer 120 as also serving as a user interface to the configuration application 220, different embodiments may utilize separate interfaces for the alarm analyzer 120 and configuration application 220, or no interface for one or both.

The alarm analyzer 120 may also output notifications 130, which may include sending emails related to the status of the network. Such notifications may be scheduled or event-based.

Figure 3A:
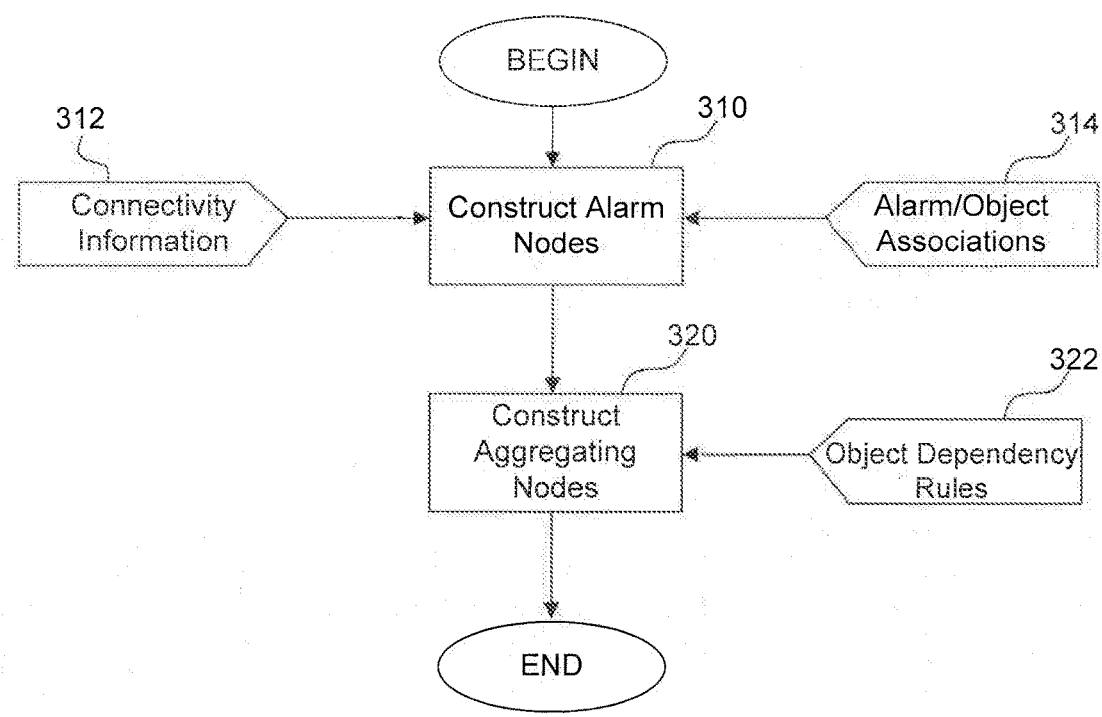
FIG. 3A is a flowchart for an embodiment of the topology builder.

FIG. 3A illustrates a flowchart for an embodiment of the topology builder 210. The topology builder 210 utilizes the connectivity information 312 from connectivity database 230 and the rules 322 and associations 314 from the configuration application 220 to construct the network alarm topology 125 for the alarm analyzer 120. The network alarm topology 120 comprises alarm nodes and aggregating nodes, both of which have associated alarm states. Although FIG. 3A illustrates construction of the alarm nodes before construction of the aggregating nodes, their order of construction may differ in some embodiments. Furthermore, in some embodiments, construction of one type of node may not be complete before topology builder 210 begins construction of another type of node.

Figure 3B:
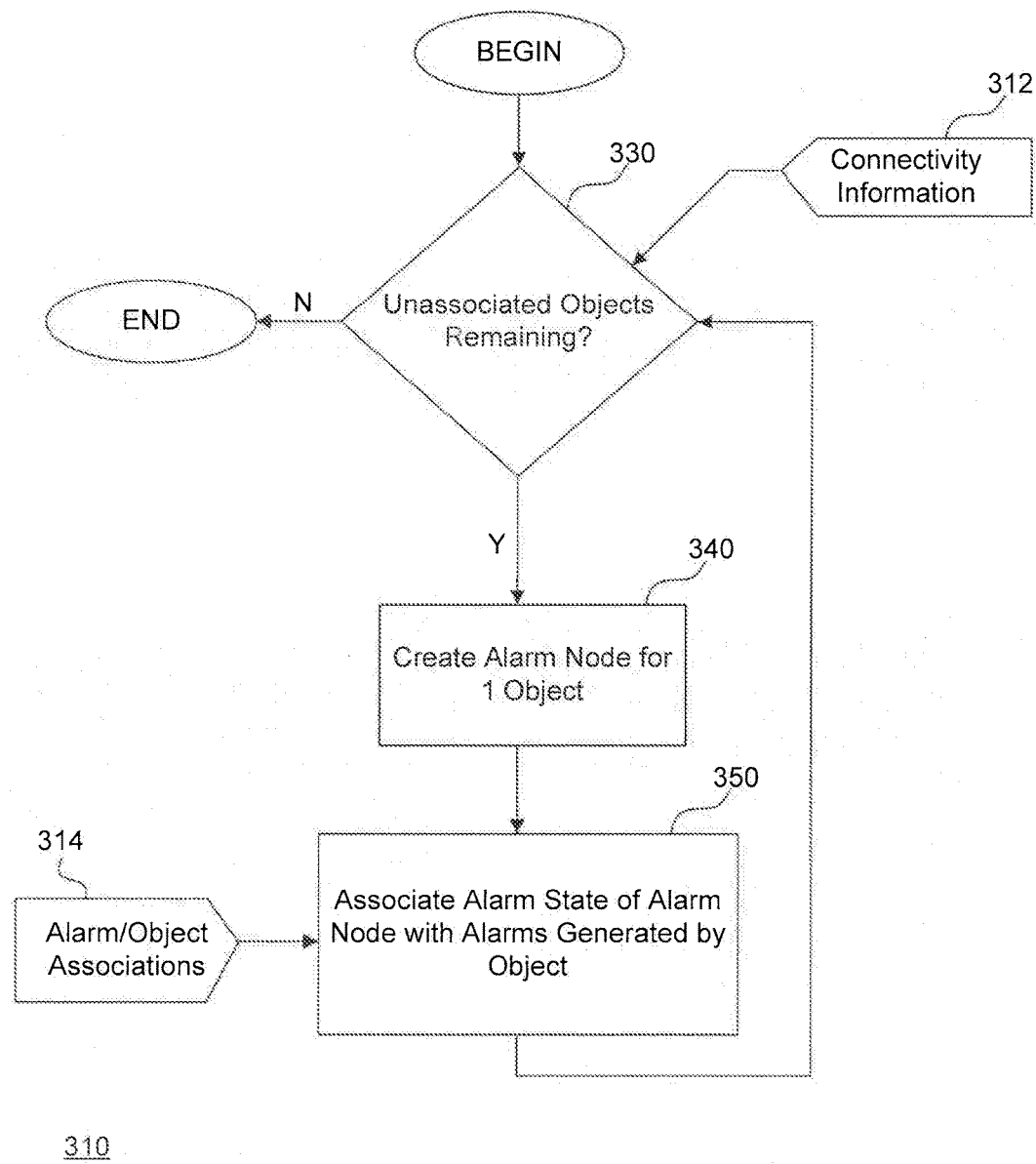
FIG. 3B is a flowchart for an embodiment of topology building steps related to alarm nodes.

As shown in FIG. 3B, alarm nodes are created 340 for each object. Creation of an alarm node may comprise setting various parameters such as a name of the object generating the alarm, the monitored status of the object (whether alarms generated by the object will be monitored by the system or not), or a provisioning state of the object (whether the object is pending, being tested, ready for operation, live, or in a maintenance state). The alarm states of the alarm nodes are associated 350 with incoming alarms from associated alarm-generating network objects. When no objects remain 330 to associate with new alarm nodes, alarm node construction 310 ends. Although FIG. 3B illustrates creating alarm nodes sequentially, one at a time, the topology builder may, in some embodiments, construct some or all alarm nodes in parallel.

Figure 3C:
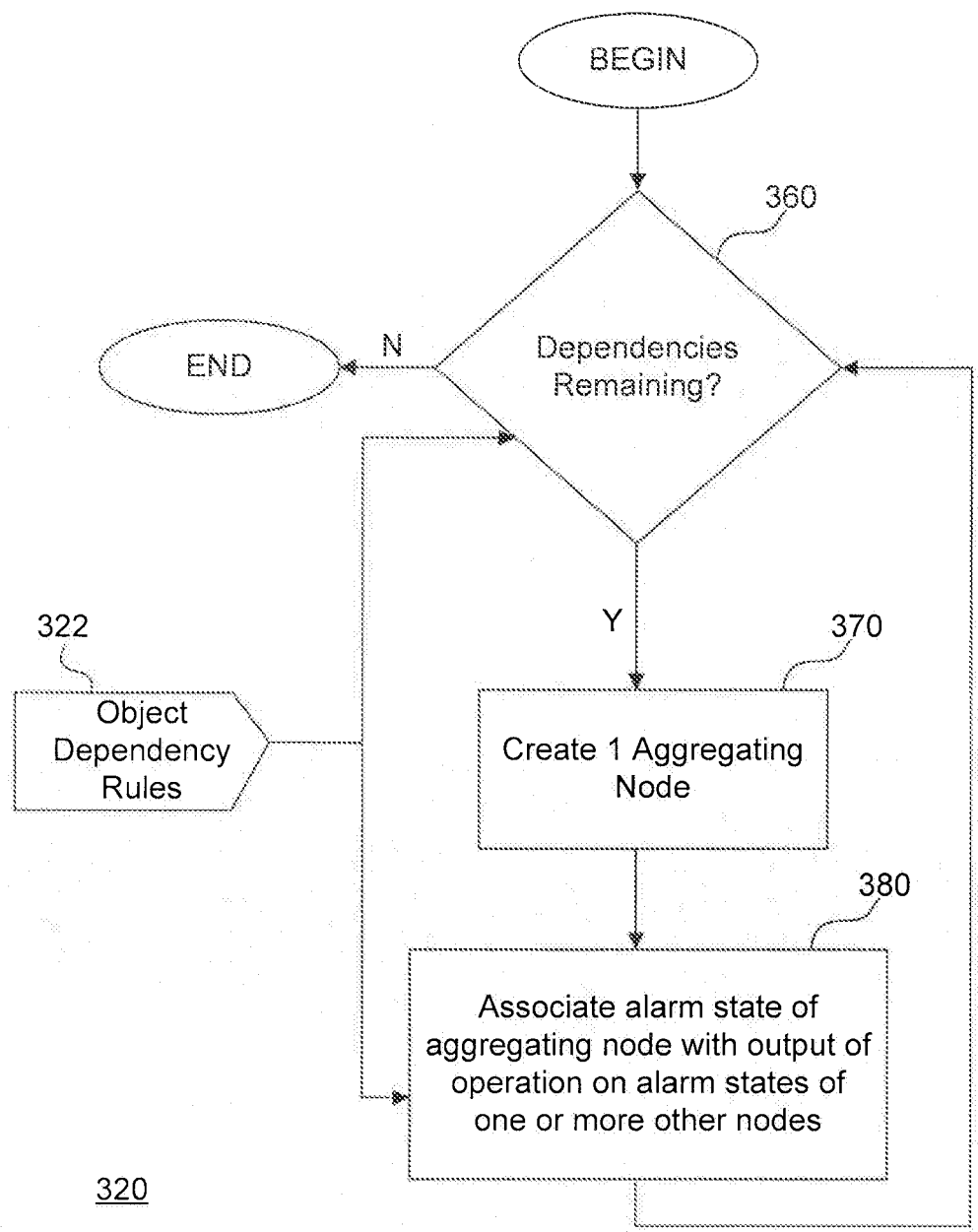
FIG. 3C is a flowchart for an embodiment of topology building steps related to aggregating nodes.

As shown in FIG. 3C, aggregating nodes are created 370 for each dependency. Creation 370 of aggregating nodes may comprise setting various parameters such as a name of the aggregating node and the operation the node will perform on the alarm states it aggregates. The alarm states of the aggregating nodes are associated 380 with the output of an operation on one or more alarm states of subordinate nodes based on object dependency rules 322 retrieved from connectivity database 230. Subordinate nodes may include both alarm nodes and aggregating nodes. Embodiments for the operation of aggregating nodes are discussed below in relation to the alarm analyzer 120. Similar to the construction of alarm nodes, some or all aggregating nodes may be constructed in parallel.

Figure 3D:
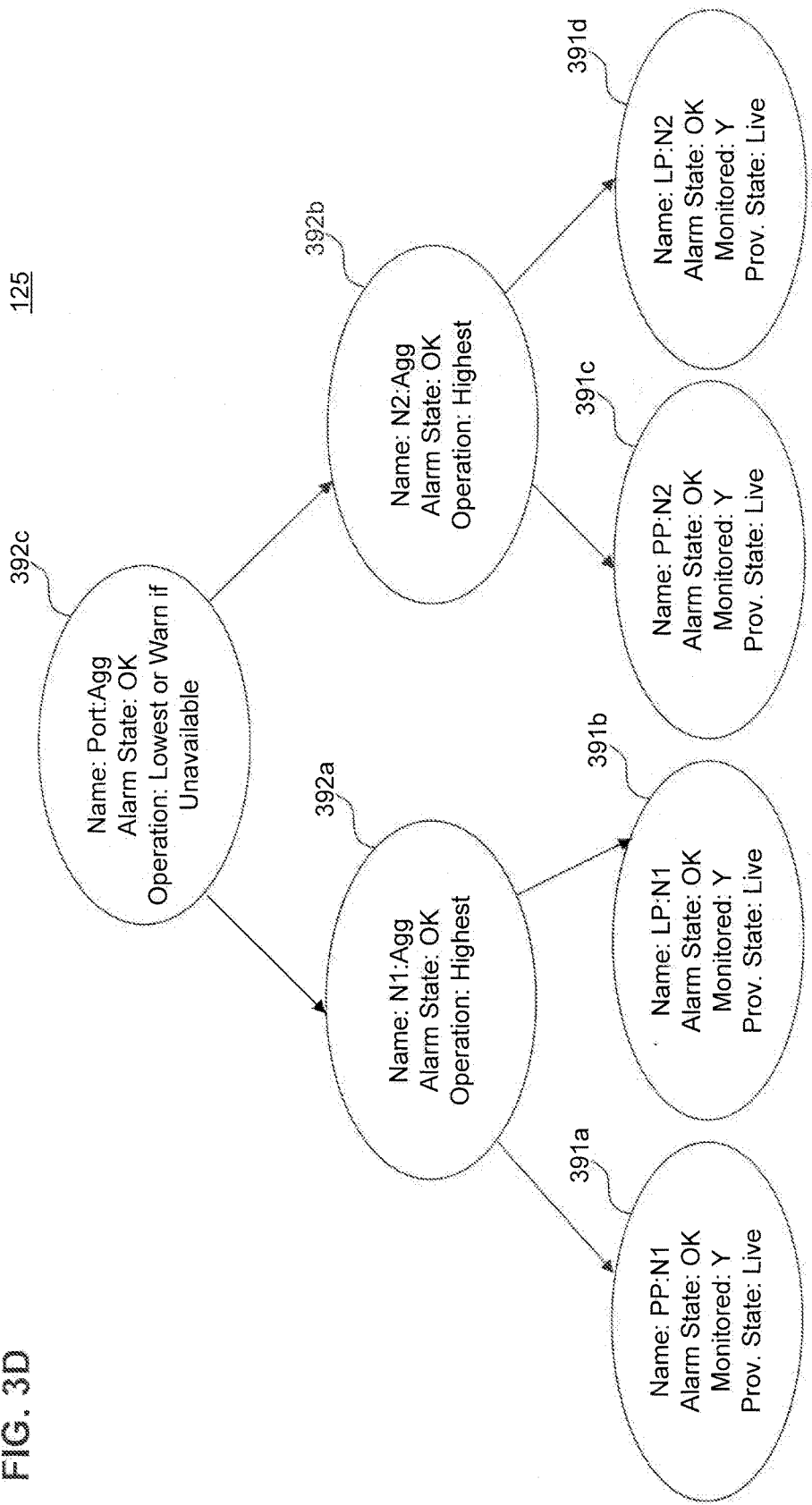
FIG. 3D illustrates an example network alarm topology.

FIG. 3D illustrates an example network alarm topology 125 created by the topology builder 210. For this example, there are four alarm-generating objects in the network: 2 physical ports (PP) and 2 link aggregation ports (LP). Two chassis, N1 and N2, house the ports. The topology builder 210 first constructs 310 the alarm nodes 391 using connectivity information 312 from the connectivity database 230 and alarm/object associations 314 from configuration application 220. All associated objects are monitored and in a live provisioning state.

The topology builder 210 further constructs 320 the aggregating nodes 392 using object dependency rules 322 from configuration application 220. In the exemplary case illustrated in FIG. 3D, two aggregating nodes 392a and 392b are created corresponding to chassis N1 and N2, respectively, as well as a third aggregating node 392c corresponding to all the ports in both chassis. Aggregating nodes may be assigned a name and/or an operation. Operations are described below in relation to FIG. 4.

Figure 4:
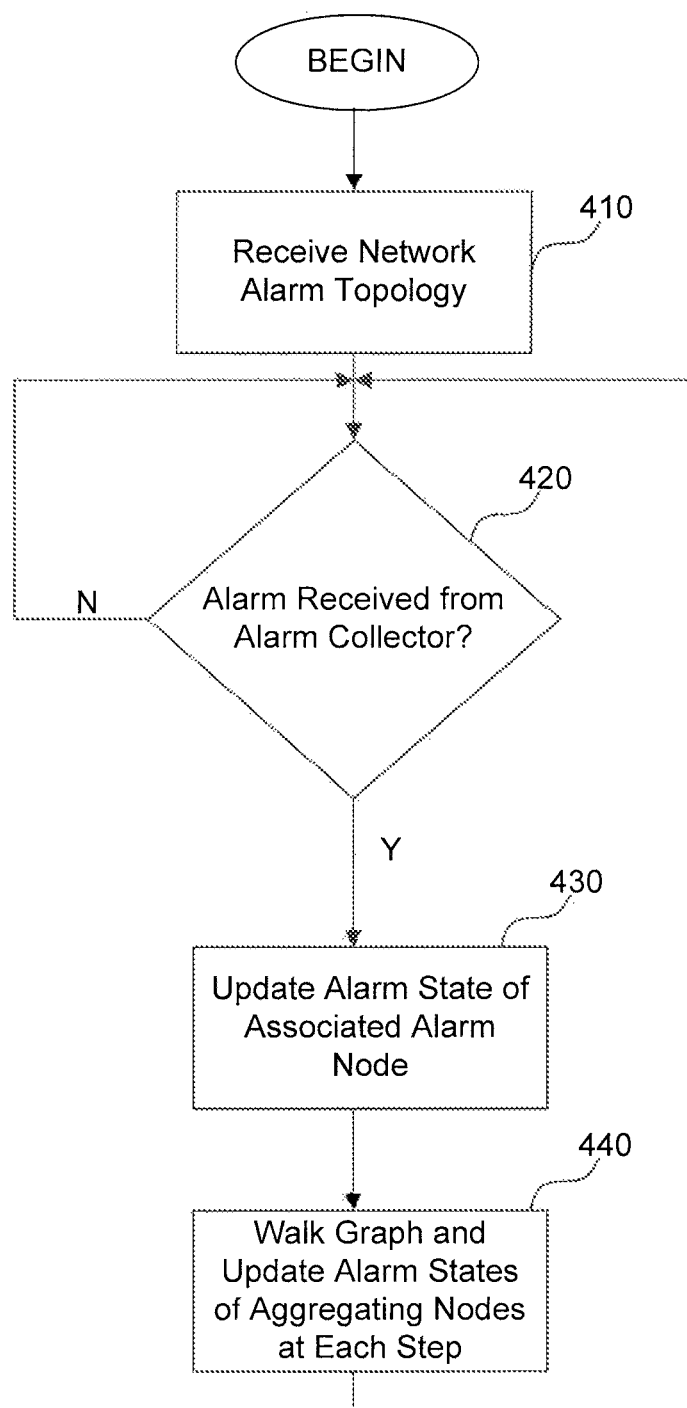
FIG. 4 is a flowchart for an embodiment of the alarm analyzer.

FIG. 4 illustrates a flowchart for an embodiment of the alarm analyzer 120. The alarm analyzer may receive 410 the alarm topology 125 from the topology builder 210. In some embodiments the topology builder 210 provides topology updates to the alarm analyzer 120. When an alarm 115 is passed 420 from the alarm collector 110 to the alarm analyzer 120, the alarm analyzer 120 correspondingly sets 430 the alarm state of the associated alarm node or nodes.

The alarm states of any aggregating nodes that operate on the associated alarm node are then calculated 440. The alarm states of these aggregating nodes may be further operated on by other aggregating nodes, and such operations may be updated in real-time until all the alarm states depending directly or indirectly on the alarm node have been updated. The process of propagating alarm updates through the network alarm topology is sometimes referred to as "walking the graph" when the network alarm topology is represented as a graph. The processing in step 440 may also include event notifications or periodic status updates in the forms of, for example, emails or an alarm history presented in a graphical interface.

The operation performed by an aggregating node on other nodes' alarm states may be a function of priority, time, and/or redundancy. Example operations that depend on priority include outputting the highest priority alarm state of one or more input alarm states, or outputting the lowest priority alarm state of one or more input alarm states. An example list of alarm state priorities in order of highest to lowest may be FAIL, WARNING, UNAVAILABLE, DEPENDENT, OK. Example operations that depend on time include a dependency operation, which is discussed in detail below. Example operations that depend on redundancy may include a protection operation that may suppress alarms from network objects having functioning backup units. Such backup units may be arranged for 1+1 protection, 1:N protection, etc.

A dependency operation may be a function of the relative timing between two or more alarms. For example, an aggregating node may have an alarm state that is associated with the output of a temporal dependency operation on the alarm states of two alarm nodes. When a first alarm node changes alarm state from "OK" to "FAIL," and the second node has an alarm state of "OK," then the aggregating node may maintain its current alarm state and begin a timer. If the second alarm node changes alarm state before the timer expires, the aggregating node may set its alarm state to "DEPENDENT" and terminate the timer. If the second alarm node changes alarm state after the timer expires, the aggregating node may set its alarm state to the second alarm node's alarm state. In this manner, the alarm analyzer 120 uses temporal information along with network connectivity information to correlate alarms and help determine a root cause of fault.

The dependency operation is asymmetric in that the result depends on the order of the alarms. For example, if a dependency operation is denoted as dependency(x,y), where x and y are alarm states of different subordinate nodes, then dependency(x,y) may produce different results than dependency(y,x). For the operation dependency(x,y), if x changes to FAIL and y is in an OK state, and no timers are running, the output is FAIL. Conversely, if y changes to FAIL and x is in an OK state, and no timers are running, the output is OK and a new timer is set as discussed above.

Figure 5A:
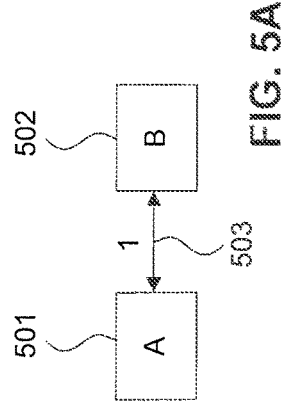
FIG. 5A illustrates a small example network for demonstrating operation of the alarm analyzer.
Figure 5B:
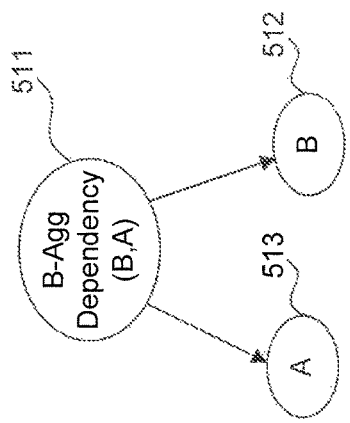
FIG. 5B illustrates an exemplary two-node dependency topology corresponding to the network in FIG. 5A.

FIG. 5A illustrates an example network 500 of alarm-generating objects labeled A 501, B 502, and 1 503. FIG. 5B illustrates an example two-node alarm topology 510 for the network 500 of FIG. 5A. Relative to FIG. 3D, details such as provisioning state and monitored status have been omitted from the illustration but may still be included in the embodiment. Although this topology 510 corresponds to the network 500, a number of topologies could similarly correspond to the network 500 based on the object dependency rules 322 provided by the configuration application 220. In alarm topology 510, nodes 512 and 513 are alarm nodes corresponding to network objects 501 and 502, respectively.

Node 511 is an aggregating node that models the dependency between network objects 501 and 502. The aggregating node 511 is illustrated with its name and alarm operation. Node 511 is named B-Agg and aggregates alarms to produce an aggregated status for network object B 502.

Figure 5C:
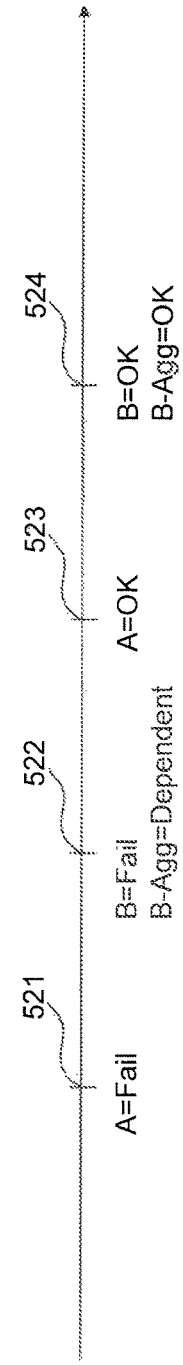
FIG. 5C is an exemplary timeline illustrating alarm states as a failure in node A propagates to node B.

FIG. 5C illustrates an example timeline 520 of alarm statuses in the alarm topology 510 corresponding to network 500. The initial condition for each node in the topology is an alarm status of "OK." At 521, the alarm analyzer 120 receives 420 a "FAIL" alarm originating from network object A 501 (possibly filtered and normalized by alarm collector 110). The alarm analyzer 120 sets 430 the alarm state of node A 513 to "FAIL" and sets 440 the alarm states of dependent aggregating nodes. Specifically, one aggregating node depends on A 513: B-Agg 511. Node 511 has a dependency operation such that node B 512 depends on node A 513, denoted as (B,A). Since node A 513 has a state of "FAIL" whereas node B 512 has a state of "OK," the state of node B-Agg 511 will be set to "OK." However, the alarm analyzer 120 may begin a timer for later use in determining dependent failures relating to B-Agg 511.

At 522, the alarm analyzer 120 receives 420 a "FAIL" alarm originating from network object B 502 (possibly filtered and normalized by alarm collector 110). The alarm analyzer 120 sets 430 the alarm state of node B 512 to "FAIL" and sets 440 the alarm states of dependent aggregating nodes. Specifically, one aggregating nodes depends on alarm node B 512: B-Agg 511. Node B-Agg 562 will have a new alarm state of "DEPENDENT" since alarm node A 513 is in a "FAIL" state assuming the time between point 522 and 521 is less than some threshold. Otherwise, node B-Agg 511 may be set to "FAIL." At this point, the timer for B-Agg 511 may be terminated.

At 523, the alarm analyzer 120 receives 420 an "OK" alarm originating from network object A 501. The alarm analyzer 120 sets 430 the alarm state of node A 513 to "OK" and sets 440 the alarm states of dependent aggregating nodes. Node B-Agg 511 will remain in a "DEPENDENT" state. The alarm analyzer 120 may begin a timer for B-Agg 511. If node B 512 does not change state to "OK" before the expiration of the timer, B-Agg 511 may change its state to "FAIL" to reflect the fact that network object B 502 has not returned to a functional state even though network object A 501 has done so.

At 524, the alarm analyzer 120 receives 420 an "OK" alarm originating from network object B 502. The alarm analyzer 120 sets 430 the alarm state of node B 512 to "OK" and sets 440 the alarm states of dependent aggregating nodes. The state for node B-Agg 511 changes from "DEPENDENT" to "OK." At this point the timer for node B-Agg 511 may be terminated.

Over the course of the timeline 520 presented in FIG. 5C, both objects A 501 and B 502 generated "FAIL" alarms, while only object A 501 was an actual source of fault. A network operator observing only the alarms may not have been able to discriminate the source of failure even in the trivial example network 500 since the failure alarms arriving at 521-522 may have appeared simultaneous to a human operator. Using an embodiment of the disclosed invention, however, the operator would observe that B-Agg 511 showed a "DEPENDENT" state, indicating that object A 501 is the likely source of fault in the network. This would enable a quick response to the failure in object A 501, resulting in less downtime in the object and the minimization of collateral network failure.

Figure 5D:
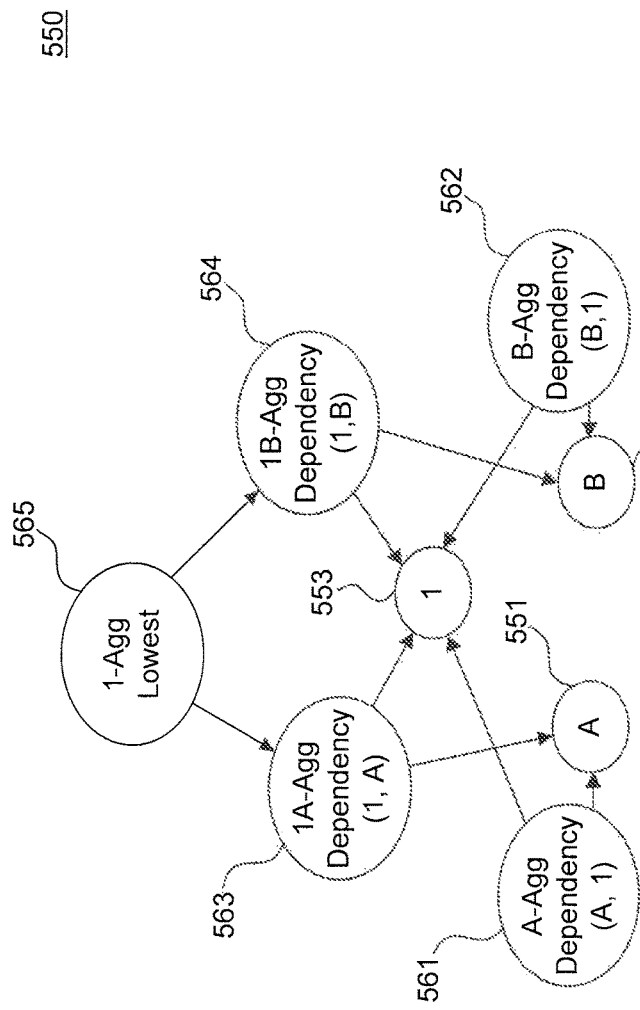
FIG. 5D illustrates an exemplary three-node alarm topology corresponding to the network in FIG. 5A.

FIG. 5D illustrates an example alarm topology 550 for the network 500 of FIG. 5A. Relative to FIG. 3D, details such as provisioning state and monitored status have been omitted from the illustration but may still be included in the embodiment. Although this topology 550 corresponds to the network 500, a number of topologies could similarly correspond to the network 500 based on the object dependency rules 322 provided by the configuration application 220. In alarm topology 550, nodes 551, 552, and 553 are alarm nodes corresponding to network objects 501, 502, and 503, respectively. Nodes 561-565 are aggregating nodes that model the dependencies between network objects 501-503. Each aggregating node 561-565 is illustrated with its name and alarm operation. Node 561 is named A-Agg and aggregates alarms to produce an aggregated status for network object A 501. Node 562 is named B-Agg and aggregates alarms to produce an aggregated status for network object B 502. Node 565 is named 1-Agg and aggregates alarms (via subordinate aggregating nodes 563 and 564) to produce an aggregated status for network object 1 503.

Figure 5E:
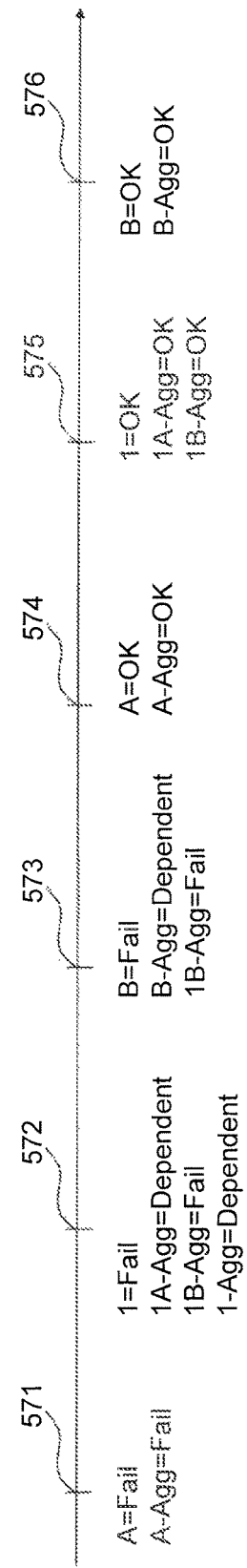
FIG. 5E is an exemplary timeline illustrating alarm states of the topology in FIG. 5D as a failure in node A propagates to nodes 1 and B.

FIG. 5E illustrates an example timeline 570 of alarm statuses in the alarm topology 550 corresponding to network 500. The initial condition for each node in the topology is an alarm status of "OK." At 571, the alarm analyzer 120 receives 420 a "FAIL" alarm originating from network object A 501 (possibly filtered and normalized by alarm collector 110). The alarm analyzer 120 sets 430 the alarm state of node A 551 to "FAIL" and sets 440 the alarm states of dependent aggregating nodes. Specifically, two aggregating nodes depend on A 551: A-Agg 561 and 1A-Agg 563. Both nodes 561 and 563 contain dependency operations. Node 561 has a dependency operation such that node A 551 depends on node 1 553, denoted as (A,1), whereas node 563 has a dependency operation such that node 1 553 depends on node A 551, denoted as (1,A). Since node A 551 has a state of "FAIL" whereas node 1 553 has a state of "OK," the state of node A-Agg 561 will be set to "FAIL" and the state of node 1A-Agg 563 will be set to "OK." However, the alarm analyzer 120 may begin a timer for later use in determining dependent failures relating to 1A-Agg 563.

At 572, the alarm analyzer 120 receives 420 a "FAIL" alarm originating from network object 1 503 (possibly filtered and normalized by alarm collector 110). The alarm analyzer 120 sets 430 the alarm state of node 1 553 to "FAIL" and sets 440 the alarm states of dependent aggregating nodes. Specifically, four aggregating nodes depend on alarm node 1 553: A-Agg 561, 1A-Agg 563, 1B-Agg 564, and B-Agg 562. A-Agg 561 and B-Agg 562 will not change their alarm states based on the changed state in alarm node 1 553, although a timer may begin for node B-Agg 562 in relation to its dependency operation. Nodes 1A-Agg 563 and 1B-Agg 564, however, will change their alarm states. Specifically, 1A-Agg 563 will change its state to "DEPENDENT" since node A 551 has an alarm state of "FAIL," assuming the time between point 572 and 571 is less than some duration. At this point, the timer for 1A-Agg 563 may be terminated.

Since node B 552 has an alarm state of "OK," aggregating node 1B-Agg 564 will set its alarm state to "FAIL." Furthermore, node 1-Agg 565 depends on both nodes 563 and 564, so the alarm analyzer 120 evaluates its alarm state as well. Node 565 performs a "lowest" priority operation on the states of nodes 563 ("DEPENDENT") and 564 ("FAIL"), so the alarm state of 1-Agg 565 is set to "DEPENDENT." Thus, although object 1 503 has generated an alarm, the network operator may focus on the alarm state of node 565 and determine that object 1 503 is not the likely source of fault.

At 573, the alarm analyzer 120 receives 420 a "FAIL" alarm originating from network object B 502 (possibly filtered and normalized by alarm collector 110). The alarm analyzer 120 sets 430 the alarm state of node B 552 to "FAIL" and sets 440 the alarm states of dependent aggregating nodes. Specifically, two aggregating nodes depend on alarm node B 552: B-Agg 562 and 1B-Agg 564. The state of 1B-Agg 564 will not change due to the alarm state change in node B 552 since node 1 553 is already in a "FAIL" state. Node B-Agg 562, however, will have a new alarm state of "DEPENDENT" since alarm node 1 553 is in a "FAIL" state assuming the time between point 573 and 572 is less than some threshold. Otherwise, node B-Agg 562 may be set to "FAIL." At this point, the timer for B-Agg 562 may be terminated.

At 574, the alarm analyzer 120 receives 420 an "OK" alarm originating from network object A 501. The alarm analyzer 120 sets 430 the alarm state of node A 551 to "OK" and sets 440 the alarm states of dependent aggregating nodes. Specifically, A-Agg 531 will change alarm state to "OK," while 1A-Agg 563 will remain in a "DEPENDENT" state. The alarm analyzer 120 may begin a timer for 1A-Agg 563. If node 1 553 does not change state to "OK" before the expiration of the timer, 1A-Agg 563 may change its state to "FAIL" to reflect the fact that network object 1 503 has not returned to a functional state even though network object A 501 has done so.

At 575, the alarm analyzer 120 receives 420 an "OK" alarm originating from network object 1 503. The alarm analyzer 120 sets 430 the alarm state of node 1 553 to "OK" and sets 440 the alarm states of dependent aggregating nodes. Specifically, 1A-Agg 563 will change to an "OK" state and the associated timer may be terminated. Node 1B-Agg 564 will also change state to "OK." The alarm state for node B-Agg 562 will remain "DEPENDENT" but the alarm analyzer 120 may begin a timer for later use in relation to the node's state.

At 576, the alarm analyzer 120 receives 420 an "OK" alarm originating from network object B 502. The alarm analyzer 120 sets 430 the alarm state of node B 552 to "OK" and sets 440 the alarm states of dependent aggregating nodes. The state of node 1B-Agg 564 will remain "OK," whereas the state for node B-Agg 562 changes from "DEPENDENT" to "OK." At this point the timer for node B-Agg 562 may be terminated.

Over the course of the timeline 570 presented in FIG. 5E, all three objects A 501, B 502, and 1 503 generated "FAIL" alarms, while only object A 501 was an actual source of fault. A network operator observing only the alarms may not have been able to discriminate the source of failure even in the trivial example network 500 since the failure alarms arriving at 571-573 may have appeared simultaneous to a human operator. Using an embodiment of the disclosed invention, however, the operator would observe that A-Agg 561 showed a "FAIL" state, whereas 1-Agg 565 and B-Agg 562 showed "DEPENDENT" states, indicating that object A 501 is the likely source of fault in the network. This would enable a quick response to the failure in object A 501, resulting in less downtime in the object and the minimization of collateral network failure.

Identifiers, such as "(a)," "(b)," "(i)," "(ii)," etc., are sometimes used for different elements or steps. These identifiers are used for clarity and do not necessarily designate an order for the elements or steps.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A network fault analysis system, comprising:
   a configuration application having access to rules for determining dependencies between a plurality of network objects, and having further access to associations between a plurality of alarms and the plurality of network objects;
   a database having access to information about a connective layout of the plurality of network objects;
   a topology builder, coupled to the database and the configuration application, configured to construct a network alarm topology;
   an alarm collector configured to collect the plurality of alarms from the plurality of network objects; and
   an alarm analyzer, coupled to the topology builder and the alarm collector, configured to discriminate between failure alarms and dependent alarms, wherein a failure alarm originates from a faulty network object and a dependent alarm originates from a properly functioning network object dependent on the faulty network object.

2. The system of claim 1, wherein the topology builder is further configured to dynamically adjust the network alarm topology based on changes to the connective layout.

3. The system of claim 1, wherein the alarm collector is further configured to sort the plurality of alarms in chronological order and to filter unmonitored alarms.

4. The system of claim 1, wherein the alarm collector is further configured to normalize the plurality of alarms such that alarms from different vendor network objects may be analyzed by the alarm analyzer using vendor-agnostic methods.

5. The system of claim 1, wherein the alarm analyzer is further configured to output an alarm history.

6. The system of claim 5, wherein the alarm history comprises a graphical interface displaying at least a portion of the topology and associated alarms.

7. The system of claim 6, wherein the alarm history further comprises different indications for failure alarms and dependent alarms.

8. The system of claim 1, wherein the alarm analyzer is further configured to provide notification of a state change.

9. The system of claim 1, wherein the alarm analyzer is further configured to propagate changes in alarm state through a graph based on temporal, priority, and protection relations between alarms and their originating network objects.

10. A computer-implemented method of determining a root source of failure in a network, comprising:
    forming a network alarm topology, the topology comprising:
        a first node corresponding to a first network object and having a first alarm state,
        a second node corresponding to a second network object and having a second alarm state, and
        a third node having a third alarm state, the third node configured to access the alarm states of the first and second nodes;
    receiving a first alarm from the first network object at a first time instance;
    setting the first alarm state according to the received first alarm;
    receiving a second alarm from the second network object at a second time instance;
    setting the second alarm state according to the received second alarm; and
    setting the third alarm state according to an outcome of an operation performed on the first alarm state and the second alarm state.

11. The method of claim 10, wherein the operation is a function of the first time instance and the second time instance.

12. The method of claim 11, wherein setting the third alarm state comprises:
    if the second time instance succeeds the first time instance by a duration less than a threshold, setting the third alarm state to a dependent alarm state, and otherwise setting the third alarm state to the second alarm state.

13. The method of claim 10, wherein setting the third alarm state comprises:
    setting the third alarm state to the first alarm state if the first alarm state has higher priority than the second alarm state, and otherwise setting the third alarm state to the second alarm state.

14. The method of claim 10, wherein setting the third alarm state comprises:
    setting the third alarm state to the first alarm state if the first alarm state has lower priority than the second alarm state, and otherwise setting the third alarm state to the second alarm state.

15. The method of claim 10 wherein setting the third alarm state comprises:
    setting the third alarm state to a warning state if exactly one of the first alarm state and second alarm state is in a failure state; and
    setting the third alarm state to a failure state if both the first alarm state and second alarm state are in a failure state.

16. A computer-implemented method of building a network alarm topology, comprising:
    retrieving a list of alarm-generating network objects from a database;
    retrieving, from a configuration application, a plurality of rules for determining dependences between a plurality of network objects;
    retrieving, from the configuration application, a plurality of associations between alarms and network objects;
    constructing a plurality of alarm nodes corresponding to the plurality of alarm-generating network objects;
    associating, using the plurality of associations, an alarm state of each of the alarm nodes with an alarm received from the associated alarm-generating network object;
    constructing, using the plurality of rules, a plurality of aggregating nodes, each aggregating node performing an operation on the alarm states of two or more subordinate nodes to form an output, wherein the subordinate nodes comprise alarm nodes or other aggregating nodes; and
    associating an alarm state of each aggregating node with the output of the corresponding operation.

17. The method of claim 16 wherein the plurality of rules are configurable by a user.

18. The method of claim 16 wherein the associations between alarms and network objects are configurable by a user.

19. The method of claim 16 wherein the operation is a function of a temporal relation between the alarm states of the two or more subordinate nodes.

20. The method of claim 16 further comprising graphically displaying the topology, alarm history, and alarm states to a user.

* * * * *